(12) United States Patent
Suzuki

(10) Patent No.: US 9,092,373 B2
(45) Date of Patent: Jul. 28, 2015

(54) MICROCOMPUTER WITH BOOTABLE FLASH MEMORY

(75) Inventor: Yoshitaka Suzuki, Tokyo (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 1406 days.

(21) Appl. No.: 11/653,424

(22) Filed: Jan. 16, 2007

(65) Prior Publication Data

US 2007/0192531 A1 Aug. 16, 2007

(30) Foreign Application Priority Data

Jan. 16, 2006 (JP) .................................. 2006-006957

(51) Int. Cl.
*G06F 21/79* (2013.01)
*G06F 12/14* (2006.01)

(52) U.S. Cl.
CPC ............ *G06F 12/1425* (2013.01); *G06F 21/79* (2013.01)

(58) Field of Classification Search
USPC .......................................................... 726/27
See application file for complete search history.

(56) References Cited

U.S. PATENT DOCUMENTS

| 6,661,710 B2 * | 12/2003 | Kwon ...................... 365/185.24 |
| 6,920,566 B2 * | 7/2005 | Lewis ........................... 713/194 |
| 7,318,129 B1 * | 1/2008 | Falik et al. .................... 711/152 |
| 2002/0073340 A1 * | 6/2002 | Mambakkam et al. ....... 713/202 |

FOREIGN PATENT DOCUMENTS

| JP | 08-137757 | 5/1996 |
| JP | 2004-185536 | 7/2004 |
| JP | 2004-355383 | 12/2004 |

* cited by examiner

*Primary Examiner* — Alexander Lagor
(74) *Attorney, Agent, or Firm* — Studebaker & Brackett PC

(57) ABSTRACT

The present invention provides a microcomputer having a CPU, a flash ROM which stores programs or the like therein and a read controller which controls reading of the flash ROM. In the microcomputer, the flash ROM is partitioned by sectors. When a read address is designated, the flash ROM outputs read data and security information for a sector corresponding to the read address. On the other hand, the read controller includes a switch which sets whether the flash ROM is of a boot device. When the flash ROM is undesignated as the boot device and the read data is protected by the security information, the read controller stops the output of the read data.

4 Claims, 2 Drawing Sheets

MICROCOMPUTER WITH BOOTABLE FLASH MEMORY

BACKGROUND OF THE INVENTION

The present invention relates to a microcomputer equipped with a built-in memory, and particularly to a security holding function for data written into the built-in memory.

FIG. 2 is a schematic block diagram of a conventional microcomputer.

The microcomputer 10 includes a central processing unit (hereinafter called "CPU") 11 that executes processing and control in accordance with programs, and a rewritable or reprogrammable nonvolatile memory (hereinafter called "flash ROM") 12 in which the programs or the like are stored. A read controller 13 connects between the CPU 11 and the flash ROM 12.

The read controller 13 has the function of reading data such as the programs written into the flash ROM 12 in accordance with a read request (address ADR intended for reading and control signal CON) made from the CPU 11 and supplying the read data RDM to the CPU 11, and outputting the read data to an external circuit 21 when the data RDM is not set to an outward output inhibited state. That is, the flash ROM 12 has a continuous address space partitioned in units called sectors every constant memory area and contains therein security information SEC indicative of whether the output of data to the outside should be inhibited, which has been set to each sector. When an address ADR intended for reading is designated, the flash ROM 12 outputs the security information SEC of the corresponding sector along with data RDM read from the address ADR.

On the other hand, the read controller 13 has a selector (SEL) 13a. When the output of the data to the outside is not inhibited based on the security information SEC, the read controller 13 selects data RDM and outputs it to an external circuit 21. When the output thereof to the outside is inhibited, the read controller 13 selects a fixed value FIX and outputs it to the external circuit 21.

The CPU 11 is further connected to an internal bus 14. A plurality of functional blocks 15a, 15b, such as a peripheral input/output unit which performs the input/output of signals from and to peripheral circuits, a timer which counts a set time, etc., and an external memory controller 16 are connected to the internal bus 14. The external memory controller 16 performs reading/writing of data from and to an external read-only memory (hereinafter called "ROM") 23 and a random access memory (hereinafter called "RAM") 24 via an external bus 22 provided outside the microcomputer 10.

When an address ADR intended for reading is outputted from the CPU 11 in the microcomputer 10, the flash ROM 12 reads data RDM from the designated address ADR and outputs security information SEC for the corresponding sector. The security information SEC is supplied to the selector 13a of the read controller 13 as a selection signal. If the output of data to the outside is inhibited by the security information SEC, then the selector 13a selects a fixed value FIX and outputs it to the external circuit 21. If the output thereof to the outside is allowed by the security information SEC, then the selector 13a selects read data RDM and outputs it to the external circuit 21.

Thus, the data RDM set to the outward output inhibited state is prevented from being outputted to the external circuit 21. Hence, the security of the data stored in the flash ROM 12 can be protected.

The above prior art refers to patent documents 1 (Japanese Unexamined Patent Publication. No. Hei 8(1996) -137757) and 2 (Japanese Unexamined Patent Publication No. 2004-185536).

Incidentally, a memory control circuit equipped with a CPU 11, memories 12a and 12b which store therein information containing programs to be executed by the CPU 11, a program area monitoring circuit 30 which monitors an area accessed by the corresponding program being executed by the CPU 11, an access inhibition setting register 20 which stores therein access inhibition setting information for inhibiting external access to each memory, a memory access inhibition signal generating circuit 40 which generates a memory access inhibition signal for inhibiting the access to the memory, based on the result of monitoring by the program area monitoring circuit and the access inhibition setting information, and a memory access control circuit 50 which controls the reading of information stored in each memory from the memory to the outside on the basis of the memory access inhibition signal, has been described in FIG. 1 and its descriptive text of a patent document 3 (Japanese Unexamined Patent Publication No. 2004-355383), for example.

However, the microcomputer 10 involves a problem in that when the CPU 11 is started up with the external ROM 23 or RAM 24 as a boot device (corresponding to a memory device with a startup program stored therein), the contents of the flash ROM 12 can be read regardless of the security information SEC depending on the programs from the internal flash ROM 12 via the read controller 13, the CPU 11, the internal bus 14, the external memory controller 16 and the external bus 22.

SUMMARY OF THE INVENTION

An object of the present invention is to prevent the output of data of a security-protected built-in memory to the outside regardless of the location of existence of a startup program.

According to one aspect of the present invention, for attaining the above object, there is provided a microcomputer comprising a CPU which performs processing and control in accordance with programs, a memory which stores data containing the programs therein, and a read controller which reads the data from the memory in accordance with the control from the CPU, wherein the memory is partitioned by sectors each having a memory area in which a continuous address space is constant, and the memory outputs a memory content of an address intended for reading as read data when the address is designated and outputs security information indicative of whether a memory content of a sector to which the address belongs, is being protected, and wherein the read controller controls the output of the read data in accordance with set information indicative of whether the memory is designated as a device for storing a startup program, and the security information outputted from the memory.

In the present invention, a read controller is provided which controls the output of read data on the basis of the setting of whether a memory is being designated as a boot device, as well as security information set every sector of the memory. Thus, advantageous effects are brought about in that if the read controller is configured so as to stop the output of read data from the memory when, for example, the memory is undesignated as the boot device and the read data outputted from the memory is protected by the security information, then the memory can be used as the boot device, and when other external memory is used as the boot device, the contents of the memory can be protected.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

A read controller is provided with a register to which sector numbers used for reading/writing of data are set within sectors of a memory. When the memory is undesignated as a boot device and read data outputted from the memory is protected by its corresponding security information, and a read address for the memory does not belong to the sectors set to the register, the read controller stops the output of the read data and outputs the read data when other than the above. Thus, the memory can be used as an area for reading and writing arbitrary data as well as for storage of each program.

The above and other objects and novel features of the present invention will become more completely apparent from the following descriptions of preferred embodiments when the same is read with reference to the accompanying drawings. The drawings, however, are for the purpose of illustration only and by no means limitative of the invention.

First Preferred Embodiment

Figure 1:
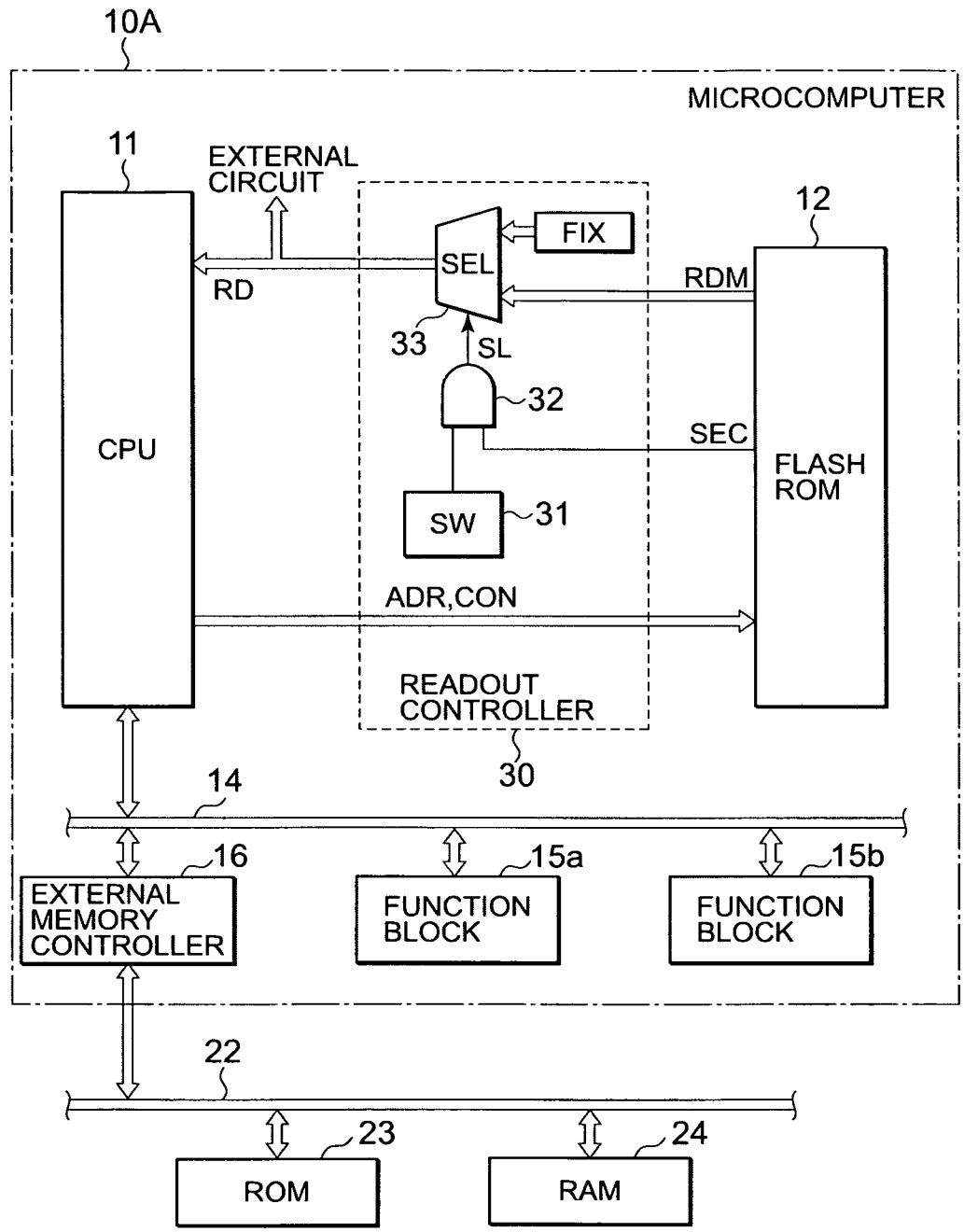
FIG. 1 is a schematic block diagram of a microcomputer showing a first embodiment of the present invention.
Figure 2:
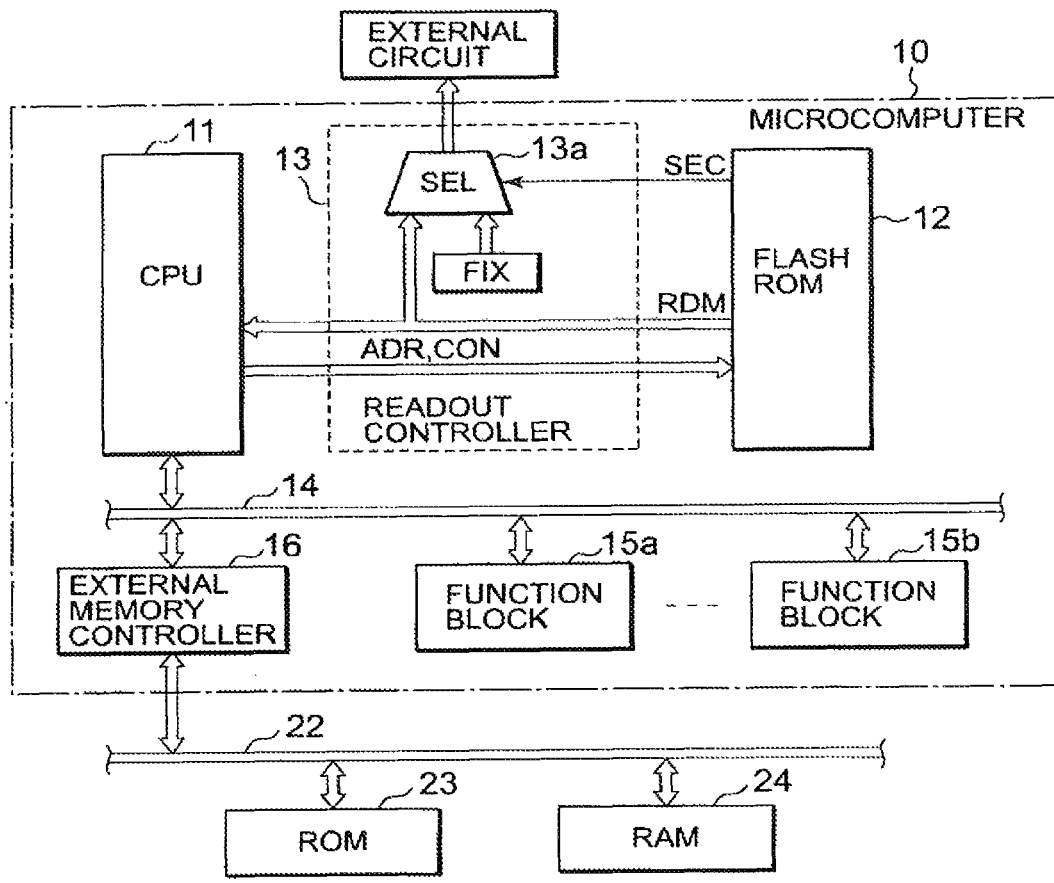
FIG. 2 is a schematic block diagram of a conventional microcomputer.

FIG. 1 is a schematic block diagram of a microcomputer showing a first embodiment of the present invention. Constituent elements common to those shown in FIG. 2 are given common reference numerals respectively.

The microcomputer 10A includes a CPU 11 that executes processing and control in accordance with programs, and a flash ROM 12 in which the programs or the like are stored. A read controller 30 connects between the CPU 11 and the flash ROM 12.

The read controller 30 reads data RDM and security information SEC such as the programs or the like which have been written in the flash ROM 12, in accordance with a read request (each address ADR intended for reading and control signal CON) made from the CPU 11. When the data RDM is being set to an outward output inhibited state by the security information SEC, the read controller 30 outputs the read data RDM to the CPU 11 and an external circuit or the like only where a predetermined requirement (that the flash ROM 12 has been designated to a boot device which holds a startup program read upon startup of the CPU 11) is met.

The read controller 30 has a switch (SW) 31 for setting whether the flash ROM 12 is of the boot device. The switch 31 is of, for example, a dip or DIP switch provided on a motherboard with the CPU 11 and the flash ROM 12 placed or mounted thereon. The switch 31 is set so as to output a level "L" when the flash ROM 12 is designated to the boot device and output a level "H" when one other than the flash ROM 12 is designated to the boot device.

A signal outputted from the switch 31 is applied to one input of a two-input AND gate (hereinafter called "AND") 32. The security information SEC outputted from the flash ROM 12 is applied to the other input of the AND 32.

A selector 33 selects a fixed value FIX when a selection signal SL is of "H". When the selection signal SL is of "L", the selector 33 selects the data RDM read from the flash ROM 12 and outputs the same to the CPU 11 and the external circuit or the like as read data RD.

The CPU 11 is further connected to an internal bus 14. A plurality of functional blocks 15a, 15b, . . . such as a peripheral input/output unit that performs the input/output of signals from and to peripheral circuits, a timer that counts a set time, etc., and an external memory controller 16 are connected to the internal bus 14. The external memory controller 16 performs reading/writing of data from and to an external ROM 23 and an external RAM 24 via an external bus 22 provided outside the microcomputer 10A.

The operation of the read controller 30 shown in FIG. 1 will be explained regarding three cases in accordance with the differences in the setting of the security information SEC of the flash ROM 12 and the setting of the boot device.

(1) Where the flash ROM 12 is set to the outward output inhibited state and designated to the boot device:

The output signal of the switch 31 is of "L" and the security information SEC outputted from the flash ROM 12 goes "H". Thus, the selection signal SL outputted from the AND 32 becomes "L", and hence the selector 33 selects the data RDM read from the flash ROM 12 and outputs the same as the read data RD.

(2) Where the flash ROM 12 is set to the outward output inhibited state and undesignated to the boot device:

The output signal of the switch 31 is of "H", and the security information SEC outputted from the flash ROM 12 goes "H". Thus, the selection signal SL outputted from the AND 32 becomes "H, and hence the selector 33 selects the fixed value FIX and outputs the same as the read data RD.

(3) Where the flash ROM 12 is set to an outward output permission state:

The security information SEC outputted from the flash ROM 12 goes "L". Thus, the selection signal SL outputted from the AND 32 becomes "L regardless of the setting of the switch 31, so that the selector 33 selects the data RDM read from the flash ROM 12 and outputs the same as the read data RD.

As described above, the microcomputer according to the first embodiment has the read controller 30 which outputs, as the read data RD, the fixed value FIX other than the data RDM read from the flash ROM 12 when the flash ROM 12' is set to the outward output inhibited state and undesignated to the boot device. Thus, the microcomputer has the advantage that there is no fear that when the external flash ROM 23 or RAM 24 serves as the boot device and thereby starts up the CPU 11, the data protected by the security information SEC of the internal flash ROM 12 is read outside.

Second Preferred Embodiment

Figure 3:
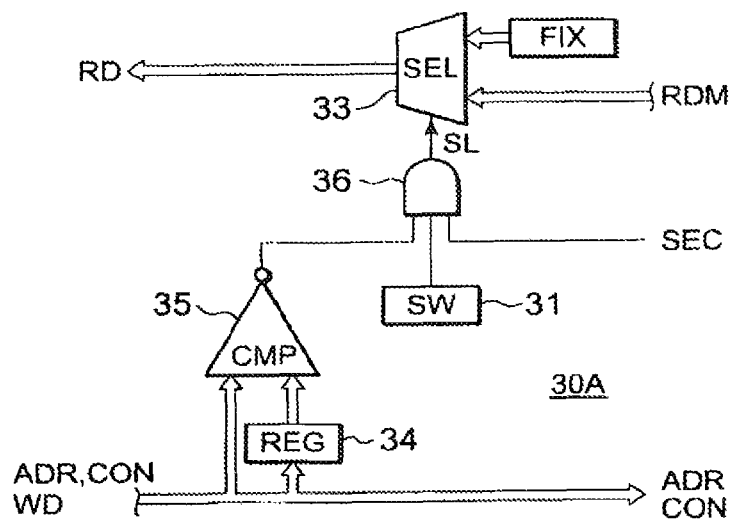
FIG. 3 is a block diagram of a read controller showing a second embodiment of the present invention.

FIG. 3 is a block diagram of a read controller showing a second embodiment of the present invention.

The read controller 30A is provided as an alternative to the read controller 30 shown in FIG. 1. Constituent elements common to those shown in FIG. 1 are given common reference numerals respectively.

The read controller 30A has a register (REG) 34 which sets sector numbers freely usable as data areas in sectors of a flash ROM 12, and a comparator (CMP) 35 which compares each of the sector numbers set to the register 34 and a sector number in addresses ADR supplied from a CPU 11 to the flash ROM 12. When the inputted two sector numbers coincide with each other, the comparator 35 outputs "L". When they do not coincide with each other, the comparator 35 outputs "H".

The output of the comparator 35 is connected to its corresponding first input of a three-input AND 36. Second and third inputs of the AND 36 are supplied with a signal outputted from a switch 31 and security information SEC outputted from the flash ROM 12. A signal outputted from the AND 36 is supplied to a selector 33 as a selection signal SL for the selector 33. Incidentally, the functions of the switch 31 and the selector 33 are identical to those shown in FIG. 1.

In the read controller 30A, each of the sector numbers usable as the data areas in the sectors of the flash ROM 12 is set to the register 34 from the CPU 11 in accordance with an initial setting program at its startup. It is however necessary that upon setting of the corresponding sector number to the register 34 at the startup, the security information SEC lying within the flash ROM 12 be set to "L" in such a manner that the outward outputting of data RDM of the flash ROM 12 is performed in an uninhibited state (there is a fear that when the security information SEC is "H", the data RDM of the flash ROM 12 is not read so that the register 34 cannot be set).

The operation of the read controller 30A shown in FIG. 3 will be explained in terms of four cases according to the differences in the setting of the security information SEC of the flash ROM 12, the setting of a boot device and the sectors intended for access.

(1) Where the flash ROM 12 is set to an outward output inhibited state, the flash ROM 12 is undesignated as the boot device and the access-target sector is not intended for each sector set to the register 34:

The security information SEC outputted from the flash ROM 12, the output signal of the switch 31 and the output signal of the comparator 35 are all brought to "H". Thus, the selection signal SL outputted from the AND 36 is brought to "H". The selector 33 selects a fixed value FIX and outputs it as read data RD.

(2) Where the flash ROM 12 is set to the outward output inhibited state, the flash ROM 12 is undesignated as the boot device, and the access-target sector is of each sector set to the register 34:

The security information SEC outputted from the flash ROM 12 and the output signal of the switch 31 are brought to "H", and the output signal of the comparator 35 is brought to "L". Thus, the selection signal SL outputted from the AND 36 is brought to "L", so that the selector 33 selects the data RDM read from the flash ROM 12 and outputs the same as read data RD.

(3) Where the flash ROM 12 is set to the outward output inhibited state and designated to the boot device:

Since the output signal of the switch 31 is of "L", the selection signal SL outputted from the AND 36 is brought to "L" regardless of the access-target sector, so that the selector 33 selects the data RDM read from the flash ROM 12 and outputs the same as read data RD.

(4) Where the flash ROM 12 is set to the outward output permission state:

The security information SEC outputted from the flash ROM 12 is brought to "L". Thus, the selection signal SL outputted from the AND 36 is brought to "L" regardless of the setting of the boot device and the access-target sector. Therefore, the selector 33 selects the data RDM read from the flash ROM 12 and outputs the same as read data RD.

As described above, the read controller 30A of the second embodiment is provided with the register 34 which sets the sector number usable as each data area within the flash ROM 12, and the comparator 35 which makes a decision as to access to the corresponding sector set to the register 34. The read controller 30A is configured so as to output the data RDM read from the flash ROM 12 as the read data RD regardless of the security information SEC in the case of the access to each sector set to the register 34. Thus, in addition to an advantage similar to the first embodiment, an advantage is brought about in that part of the flash ROM 12 can freely be used as a data area.

Incidentally, the present invention is not limited to the above embodiments. Various modifications can be made thereto. As examples for the modifications, the following are brought about, for example.

(a) Although the security protection for the built-in flash ROM 12 has been described, the present invention is not limited to the flash ROM. The present invention can similarly be applied even to the security protection for the built-in ROM and RAM or the external ROM 23 and RAM 24 or the like.

(b) Although the fixed value FIX is outputted according to the reading of the security-protected data, data such as random numbers other than the fixed value may be outputted.

(c) The setting of the boot device is not limited to the dip switch 31 but may be any means such as wiring based on a fixed pattern, a strap, a register, etc.

DRAWINGS

FIG. 1

MICROCOMPUTER SHOWING FIRST EMBODIMENT OF THE PRESENT INVENTION TO EXTERNAL CIRCUIT

10A . . . MICROCOMPUTER, 12 . . . FLASH ROM, 15a . . . FUNCTIONAL BLOCK, 15b . . . FUNCTIONAL BLOCK, 16 . . . EXTERNAL MEMORY CONTROLLER, 30 . . . READ CONTROLLER

FIG. 2

CONVENTIONAL MICROCOMPUTER

10 . . . MICROCOMPUTER, 12 . . . FLASH ROM, 13 . . . ERAD CONTROLLER, 15a . . . FUNCTIONAL BLOCK, 15b . . . FUNCTIONAL BLOCK, 16 . . . EXTERNAL MEMORY CONTROLLER, 21 . . . EXTERNAL CIRCUIT

FIG. 3

READ CONTROLLER SHOWING SECOND EMBODIMENT OF THE PRESENT INVENTION

What is claimed is:

1. A microcomputer comprising:
a central processing unit to perform processing and control in accordance with programs;
a memory to store data containing the programs therein; and
a read controller to read the data from the memory in accordance with the control from the central processing unit,
wherein the memory is partitioned by sectors each having a memory area in which a continuous address space is constant,
said memory providing a memory content of an address as read data when the address is designated, and providing security information indicative of whether or not a memory content of a sector with the address is being protected, and the read controller to control the output of the read data, wherein when the memory is undesignated as storing a startup program and the read data outputted from the memory is protected by the security information, a predetermined data, that is different from said read data stored in the memory undesignated as storing a startup program, is outputted in place of said read data;

wherein the security information is a first value, if the read data outputted from the memory is protected, and a second value, if the read data outputted from the memory is not protected, and wherein the read controller includes:
  a switch that outputs the first value when the memory us undesignated as storing a startup program and the second value when the memory is designated as storing a startup program;
  an AND gate having two input terminals that outputs a logical AND of inputted signals, the output signal from the switch being inputted to one of the input terminals and the security information outputted from the memory is being inputted to the other of the input terminals; and
  a selector, to which the read data is outputted from the memory and an output signal from the AND gate are inputted, that selects a predetermined data as an output data when the output signal from the AND gate is the second value, and the read data outputted from the memory as the output data when the output signal from the AND gate is the first value.

2. The microcomputer according to claim 1, wherein when the memory is undesignated as storing a startup program and the read data outputted from the memory is protected by security information, the read controller stops the output of the read data, and the read controller outputs the read data when other than said condition.

3. The microcomputer according to claim 1, the read controller including a register storing at least sector numbers of the memory usable as data areas, and a comparator to make a decision to access the sectors in the memory, herein when the memory is undesignated as a device for storing a startup program, read data outputted from the memory is protected by security information outputted from the memory, and when a read address for the memory is not included in the register, the read controller stops the output of the read data, and the read controller outputs the read data when other than said condition.

4. The microcomputer according to claim 1, wherein the memory is undesignated as storing a startup program and the read data outputted from the memory is protected by the security information, a data that is different from said read data and has a predetermined fixed value is outputted in place of said read data.

* * * * *